United States Patent Office 3,646,003
Patented Feb. 29, 1972

3,646,003
COPOLYMERIZABLE (ALKOXYCARBONYLPHEN-YLAZO) PHTHALOCYANINE DYESTUFFS
Bernard Lamure, Lyon, France, assignor to Societe Rhodiaceta, Paris, France
No Drawing. Filed Mar. 28, 1969, Ser. No. 811,587
Claims priority, application France, Mar. 29, 1968, 146,473
Int. Cl. C09b 43/00, 47/04; D06p 3/00
U.S. Cl. 260—146       3 Claims

ABSTRACT OF THE DISCLOSURE

Phthalocyanine dyestuffs of excellent fastness to light and solvents, which are particularly useful for colouring polyesters and polyamides in green and blue shades, have the formula:

Pc—[—D—Ar(COOR)$_n$]$_p$ where Pc is a phthalocyanine nucleus, D is —O—, —S—, alkylene, —CO—, or —N=N—, Ar is an aromatic radical, R is hydrogen atom or a hydrocarbon radical and $n$ and $p$ are each 1 to 4.

---

This invention relates to phthalocyanine dyestuffs and their use in colouring polymers.

It is known to use phthalocyanine dyestuffs carrying ester groups as coloured comonomers for the manufacture of coloured copolyesters and copolyamides.

The present invention provides the dyestuffs of the formula:

Pc—[D—Ar(COOR)$_n$]$_p$ where Pc is a metallized or unmetallized phthalocyanine nucleus, which may carry substituents in addition to those indicated, D is —O—, —S—, alkylene, —CO—, or

—N=N—

Ar is an aromatic radical of valency $n+1$, R is hydrogen atom or a substituted or unsubstituted hydrocarbon radical, and $n$ and $p$ are each integers from 1 to 4. Preferably D represents the chromophoric group —CO— or

—N=N—

Ar represents a benzene or naphthalene radical, R represents an alkyl radical of 1 to 6 carbon atoms, and $n$ is 1 or 2.

The phthalocyanine nucleus of the new dyestuffs may contain a monovalent or polyvalent metal atom bonded in the form of a complex, such as for example sodium, potassium, lithium, calcium, zinc, tin, and in particular copper, cobalt, iron, lead and nickel.

The phthalocyanine nucleus may carry substituents in addition to those indicated, such as for example lower alkyl and alkoxy radicals, or tertiary amine, nitro and halogen groups on the benzene nuclei. The radicals Ar may also carry such substituents in addition to the carboxylic ester groups.

The dyestuffs of the present invention may be obtained by various methods known for the preparation of phthalocyanines, by at least partially replacing the ortho-phthalic acid or its anhydride, amide and nitrile derivatives which are usually employed by at least one of the trimetallic or pyromellitic acids or its anhydride, ortho-diamide and ortho-dinitrile derivatives, and an aromatic polyacid of formula:

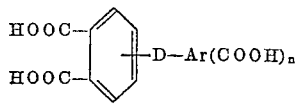

in which D, Ar and $n$ have the significance indicated above, or a derivative thereof such as the anhydride, diamide or dinitrile of the ortho-phthalic acid residue. The preferred secondary polyacids are diphenylketone-3,3',4,4'-tetracarboxylic acid and azobenzene-3,3',4,4'-tetracarboxylic acid.

The process for making the dyestuffs of the invention accordingly comprises heating at least one of the trimellitic or pyromellitic acids or its anhydride, ortho-diamide and ortho-dinitrile derivatives, and an aromatic polyacid as aforesaid or a derivative thereof, alone or with phthalic acid or a derivative thereof, and in the presence or absence of a source of nitrogen (when the said derivatives are not amides or nitriles), a source of chelatable metal, a catalyst, and/or an inert diluent and esterifying the product.

In this process it is necessary to distinguish between the methods leading to free phthalocyanines and those leading to metallized phthalocyanines.

The free phthalocyanines may be obtained directly by reaction of the ortho-dinitrile of the said aromatic polyacid, mixed with the ortho-dinitrile of the trimellitic or pyromellitic acid optionally with phthalic dinitrile, with amines or phenols in an inert solvent with heating.

It is also possible to demetallize the sodium phthalocyanine obtained by reaction of the ortho-dinitrile of the aromatic polyacid mixed optionally with phthalic dinitrile, with the sodium derivative of a fatty alcohol.

The metallized phthalocyanines of the invention may be prepared by various methods.

The first method consists of reacting the orthodinitrile of the aromatic polyacid optionally mixed with phthalic dinitrile, with a metal or a metal salt and quinoline in the presence of trichlorobenzene and with heating.

In a second method, a mixture of the aromatic polyacid its anhydride or its ortho-diamide with the trimellitic or pyromellitic acid its anhydride or its ortho-diamide, optionally with phthalic acid, its anhydride or its amide is prepared. This mixture is reacted, with heating, with urea and a metal salt in the presence of a catalyst such as ammonium molybdate or boric acid and in a diluent such as trichlorobenzene or chloronaphthalene.

The reaction, at about 250° C. for 4 to 6 hours, of a metal with a mixture of ortho-cyanoamide of the aromatic polyacid and ortho-cyanoamide of trimellitic or pyromellitic acid and optionally ortho-cyanobenzamide constitutes a third method of preparation.

Furthermore, starting from a metallized phthalocyanine it is possible to prepare another by replacing the metal of the first phthalocyanine by a different metal, which leads to the formation of a more stable complex.

Finally it is possible to introduce a metal into a free phthalocyanine.

The phthalocyanines containing carboxyl groups so obtained are then esterified in a known manner with alcohols or phenols, for example at about 235° C., under pressure. Furthermore, a phthalocyanine carrying ester groups, in accordance with the invention, can be converted into a product with different ester groups by a transesterification reaction with a different alcohol or phenol.

The dyestuffs of the invention possess colours which vary depending on the nature of the chromophoric group and in particular range from blue to green, and which have excellent fastness to light. They are insoluble in the usual organic solvents and melt at temperatures of 360° C. or above.

These dyestuffs can be used as pigments for colouring polymer compositions and preferably as coloured comonomers for the manufacture of coloured copolyesters and copolyamides, containing units of the formula:

Pc—[—D—Ar(COOR)$_{n-m}$(CO—)$_m$]$_p$ where Pc, Ar, R, n and p are as hereinbefore defined, m is an integer from 1 to 4. The coloured copolyesters are obtained by reacting at least one aliphatic or cycloalkane diol containing 2 to 10 carbon atoms with at least one aliphatic and preferably aromatic diacid, in particular terephthalic acid, or ester thereof and at least one coloured dyestuff of the present invention, this monomer being present in a minor amount relative to the whole of the constituents of the mixture, and the reaction being carried out under conditions (temperature and catalysts) which are in themselves known. Equally, coloured copolyamides are obtained by reacting a coloured dyestuff of the invention with a major proportion of a monomer which can either be a reaction product of an aliphatic or aromatic diacid with an aliphatic or aromatic diamine, or a lactam or aminoacid. The polymers thus obtained, either as such or mixed with similar non-coloured polymers, can be shaped, for example into filaments or films. All these articles possess tints of remarkable fastness, especially to light, and are characterised by high transparency which is particularly valued in the case of films.

The following examples, in which the yields are expressed by weight, illustrate the invention:

EXAMPLE 1

The following are introduced into a glass reactor of 2 litres capacity provided with a turbine stirrer:

14.8 g. (0.1 mol) of phthalic anhydride,
32.2 g. (0.1 mol) of the dianhydride of diphenylketone-3,3',4,4'-tetracarboxylic acid,
120 g. (2 mols) of urea,
10 g. of anhydrous nickel chloride ($NiCl_2$),
4 g. of ammonium molybdate, and
220 g. of nitrobenzene.

The mixture is heated for 4 hours at 210° C. with vigorous stirring. 45.4 g. (representing a yield of 95%) of a green powder are obtained which is insoluble in alkaline media and is essentially nickel bis(dicarboxylbenzoyl)phthalocyanine.

25 g. of this product and 300 ml. of butanol are introduced into an autoclave provided with a stirrer in the shape of an anchor. The autoclave is purged with nitrogen and then heated to 235° C. with stirring, this temperature being maintained for 7 hours and the autogenous pressure being about 70 bars. After cooling, the diester is removed from the autoclave and the autoclave is rinsed with 200 ml. of butanol. The residue is then washed with 200 ml. of the same solvent. After drying at 100° C. for 24 hours, 22.1 g. (a yield of 71.5%) of a green powder are obtained, this being essentially nickel bis(dibutoxycarbonylbenzoyl)phthalocyanine, the infra-red spectrum of which shows a band at 5.90 microns attributable to the carbonyl groups.

EXAMPLE 2

The procedure of the first experiment of Example 1 is followed, replacing the diphenylketone-3,3',4,4'-tetracarboxylic acid by azobenzene-3,3',4,4'-tetracarboxylic acid (32.2 g., 0.1 mol). 27.7 g. (a yield of 57.9%) of a black powder insoluble in alkaline media are obtained, this being essentially nickel bis(dicarboxylphenylazo)-phthalocyanine.

25 g. of this product are then completely esterified in 300 ml. of butanol in the same manner as in Example 1. 21.5 g. (a yield of 69.6%) of a blackish-green powder are obtained, this being essentially nickel bis(dibutoxycarbonylphenylazo)phthalocyanine.

EXAMPLE 3

The following are introduced into a glass reactors of 1 litre capacity provided with a stirring device suitable for a high vacuum, a distillation column and a nitrogen inlet tube and having on outlet orifice at the bottom:

250 g. of dimethyl terephthalate,
177.5 g. of ethylene glycol,
0.125 g. of manganese acetate ($Mn(CH_3COO)_2$),
0.01 g. of antimony oxide ($Sb_2O_3$), and
1.25 g. or a dyestuff having ester groups, as described in Example 1 or 2.

The reactor is heated with an oil bath. The transesterification is effected under normal nitrogen pressure for 3 hours at 160° to 220° C. When the theoretical amount of butanol has distilled off, the temperature is progressively raised to 275° C. and the pressure is then gradually reduced to a final pressure of 0.2 to 0.3 mm. Hg. The temperature is then raised to 280° C. and the reaction mixture kept under these conditions for 50 minutes. The resulting copolymer is a mass possessing a homogeneous colour, without inclusions, which can be very satisfactorily extruded in the molten state in the shape of filaments or transparent films.

The characteristics of the copolymers obtained with each dyestuff used are given in the table below in which "S.V." signifies the specific viscosity of the polymer as a 1% solution in ortho-chlorophenol at 25° C.

| Dyestuff | | Polymer | |
|---|---|---|---|
| Example No. | Colour | S.V. | Colour |
| 1 | Green | 0.73 | Green. |
| 2 | Blue | 0.74 | Green. |

Each of the polymers is spun in the molten state at 285° C. and the resulting yarn is stretched on a mandrel at 85° C. and on a plate at 160° C.; a yarn of 65 deniers (72.2 dtex.) gauge /33 strands is obtained. The yarns, which have the same colours as indicated for the corresponding polymers in the table above, have a strength of 4.22 g./den. (38 g./tex.) for a final elongation at break of 20.3%.

The fastness properties of the colour of the yarns are evaluated with the aid of a scale of indices ranging from 1 (very poor fastness) to 8 (exceptional fastness) in accordance with the ECE code of fastness, 2nd Edition 1958. The tests of the fastness of the colour to heat treatment are effected in accordance with the recommendations of the ECE code of fastness, 1st supplement 1963, using an apparatus sold commercially under the registered trade name "Thermotest." The ECE code of fastness (2nd Edition 1958 and supplements) is edited by the "Association for the Study and Publication of Methods for the Determination of Fastness," 12 rue d'Anjou, Paris (8e). The fastness properties of the colour of the above yarns are excellent, as is shown by the table below.

| Treatment | Fastness of the colour | Discharge onto comparison sample |
|---|---|---|
| None | 7 | |
| Desizing at the boil | 4–5 | 5 |
| Bleaching with sodium chlorite at 80° C | 5 | 5 |
| Cleaning with perchlorethylene at 60° C | 5 | 5 |
| "Thermotest" experiment at: | | |
| 150° C | 5 | 5 |
| 180° C | 5 | 5 |
| 210° C | 5 | 5 |

The shrinkages of a woven fabric measured in boiling water, in steam at 130° C. and in hot air at 180° and 210° C., are of the same order as the shrinkages observed on a control woven fabric of the same construction but undyed.

I claim:
1. A dyestuff of formula $Pc-[-D-Ar(COOR)_n]_p$, in which

Pc is a phthalocyanine residue which is unmetallised or metallised with copper, cobalt, iron, lead or nickel,
D is $-N=N-$,
Ar is a benzene radical of formula $C_6H_{(5-n)}$,
R is an alkyl radical of 1–6 carbon atoms,
$n$ is an integer from 2 to 4, and
$p$ is an integer from 1 to 4.

2. A dyestuff according to claim 1 in which Pc is metallized with nickel.

3. A dyestuff according to claim 1 which is nickel bis(dibutoxycarbonylphenylazo)phthalocyanine.

References Cited
UNITED STATES PATENTS

| | | | |
|---|---|---|---|
| 2,363,906 | 11/1944 | Rossander et al. | 260—146 X |
| 2,604,476 | 7/1952 | Jones | 260—314.5 |
| 2,759,950 | 8/1956 | Tartter | 260—314.5 |
| 2,795,583 | 6/1957 | Martin et al. | 260—314.5 |
| 3,042,683 | 7/1962 | Howard et al. | 260—314.5 |
| 3,248,379 | 4/1966 | Stanky | 260—314.5 X |

FLOYD D. HIGEL, Primary Examiner

U.S. Cl. X.R.

106— 288Q; 117—138.8 R, 138.8 F; 260—152, 314.5